(12) United States Patent
Homma et al.

(10) Patent No.: US 7,687,172 B2
(45) Date of Patent: Mar. 30, 2010

(54) FUEL CELL SYSTEM

(75) Inventors: Hiroki Homma, Asaka (JP); Tadashi Tsunoda, Nerima-ku (JP); Koji Dan, Niiza (JP)

(73) Assignee: Honda Motor Co., Ltd., Tokyo (JP)

( * ) Notice: Subject to any disclaimer, the term of this patent is extended or adjusted under 35 U.S.C. 154(b) by 1117 days.

(21) Appl. No.: 11/317,964

(22) Filed: Dec. 22, 2005

(65) Prior Publication Data

US 2006/0134477 A1 Jun. 22, 2006

(30) Foreign Application Priority Data

Dec. 22, 2004 (JP) .............................. 2004-370783
Dec. 22, 2004 (JP) .............................. 2004-370786

(51) Int. Cl.
 *H01M 8/08* (2006.01)
 *H01M 8/22* (2006.01)
(52) U.S. Cl. .............................. 429/26; 429/20; 429/34
(58) Field of Classification Search ....................... None
 See application file for complete search history.

(56) References Cited

U.S. PATENT DOCUMENTS

| | | | |
|---|---|---|---|
| 5,527,631 A * | 6/1996 | Singh et al. .................... | 429/20 |
| 5,851,689 A | 12/1998 | Chen | |
| 5,998,053 A * | 12/1999 | Diethelm ..................... | 429/14 |
| 6,042,956 A | 3/2000 | Lenel | |
| 6,232,005 B1 * | 5/2001 | Pettit ........................... | 429/19 |
| 6,303,243 B1 | 10/2001 | Schuler et al. | |
| 6,440,596 B1 * | 8/2002 | Ruhl et al. .................... | 429/34 |
| 2001/0009732 A1 | 7/2001 | Schuler | |
| 2003/0235725 A1 | 12/2003 | Haltiner et al. | |
| 2004/0048123 A1 | 3/2004 | Kelly et al. | |
| 2004/0053108 A1 | 3/2004 | Tsunoda | |
| 2006/0134476 A1 | 6/2006 | Tsunoda et al. | |
| 2008/0008917 A1 * | 1/2008 | Homma ....................... | 429/26 |

FOREIGN PATENT DOCUMENTS

| | | |
|---|---|---|
| EP | 1098381 A1 | 5/2001 |
| JP | 60-205972 | 10/1985 |

(Continued)

OTHER PUBLICATIONS

Fuel Cell Handbook (Seventh Edition), 2004, p. 1-8, [online], [retrieved on Apr. 17, 2009], Retrieved using Internet <URL:http://www.cleanfuelcellenergy.com/FCHandbook7.pdf>.*

(Continued)

*Primary Examiner*—Dah-Wei D Yuan
*Assistant Examiner*—Katherine Turner
(74) *Attorney, Agent, or Firm*—Lahive & Cockfield, LLP; Anthony A. Laurentano, Esq.

(57) ABSTRACT

A fuel cell system includes a fuel cell stack. The fuel cell stack includes a plurality of fuel cells stacked together in a stacking direction, and end plates provided at opposite ends of the fuel cells in the stacking direction. A fluid unit is provided on one side of the fuel cell stack. The fluid unit includes a heat exchanger for heating an oxygen-containing gas to be supplied to the fuel cell stack, and a reformer for reforming a fuel to produce a fuel gas.

12 Claims, 19 Drawing Sheets

FOREIGN PATENT DOCUMENTS

| | | |
|---|---|---|
| JP | 61-58176 | 3/1986 |
| JP | 62-176066 | 8/1987 |
| JP | 64-3971 | 1/1989 |
| JP | 04-019967 | 1/1992 |
| JP | 5/47395 | 2/1993 |
| JP | 08/222262 | 8/1996 |
| JP | 8-293316 | 11/1996 |
| JP | 10-55815 | 2/1998 |
| JP | 10-64568 | 3/1998 |
| JP | 10/69919 | 3/1998 |
| JP | 10/92457 | 4/1998 |
| JP | 2000-58091 | 2/2000 |
| JP | 2001-93564 | 4/2001 |
| JP | 2001-143734 | 5/2001 |
| JP | 2001-508591 | 6/2001 |
| JP | 2002/100389 | 4/2002 |
| JP | 2002-302785 | 10/2002 |
| JP | 2003/229164 | 8/2003 |
| JP | 2004/146344 A1 | 5/2004 |
| JP | 4362359 | 8/2009 |
| KR | 10-2007-0086616 A1 | 8/2007 |
| WO | WO-98/33226 A1 | 7/1998 |
| WO | WO-99/44252 A1 | 9/1999 |

OTHER PUBLICATIONS

Korean Office Action for Application No. 10-2007-7014396, dated Mar. 31, 2008.
Korean Notice of Decision for Application No. 10-2007-7014396, dated Jun. 18, 2008.
International Preliminary Report on Patentability and Written Opinion for International Application No. PCTJP2005/024180, dated Aug. 23, 2007.
Canadian Office Action for Application No. 2,590,801, dated Sep. 3, 2009.
Japanese Office Action for Application No. 2004-370786, dated Nov. 17, 2009.

* cited by examiner

FUEL CELL SYSTEM

BACKGROUND OF THE INVENTION

1. Field of the Invention

The present invention relates to a fuel cell system including a fuel cell stack, a heat exchanger, a reformer, and a casing containing the fuel cell stack, the heat exchanger, and the reformer.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell, an oxygen-containing gas or the air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

As this type of fuel cell, for example, an all-in-one, space saving compact fuel cell power generation apparatus with small heat radiation loss is disclosed in Japanese Laid-Open Patent Publication No. 10-92457 (hereinafter referred to as the "conventional technique 1"). As shown in FIG. 18, the fuel cell power generation apparatus according to the conventional technique 1 includes a fuel preheating device 1, a reformer 2, a fuel cell 3, catalyst combustors 4, and a pressure container (not shown) containing the fuel preheating device 1, the reformer 2, the fuel cell 3, and the catalyst combustors 4.

The reformer 2 is stacked on the fuel cell 3. The fuel preheating device 1 and the catalyst combustors 4 are provided around the fuel cell 3. The fuel cell 3 and the reformer 2 are sandwiched between upper and lower tightening plates 5a, 5b. Components between the tightening plates 5a, 5b are compressed, and tightened together using a plurality of connecting rods 6 to apply a predetermined surface pressure to the fuel cell 3 and the reformer 2.

In the conventional technique 1, the fuel preheating device 1 and the reformer 2 are connected by a fuel gas pipe 7a and a reformed gas pipe 7b. The fuel preheating device 1 and the fuel cell 3 are connected by a reformed gas pipe 7c. Further, the fuel cell 3 and the catalyst combustors 4 are connected by anode exhaust gas pipes 7d and cathode exhaust gas pipes 7e. The catalyst combustors 4 and the reformer 2 are connected by combustion gas pipes 7f.

As described above, in the conventional technique 1, a plurality of pipes including the fuel gas pipe 7a are provided. Thus, the thermal efficiency is lowered due to heat radiation from the pipes. Further, though the fuel cell 3 and the reformer 2 are provided in parallel, the fuel preheating device 1 and the catalyst combustors 4 are provided on sides of the fuel cell 3. Thus, the overall size of the fuel cell power generation apparatus is large.

In Japanese Laid-Open Patent Publication No. 2003-229164 (hereinafter referred to as the "conventional technique 2"), a solid oxide fuel cell system is disclosed. The solid oxide fuel cell system is proposed in an attempt to reduce the size, and reduce the heat loss as much as possible. As shown in FIG. 19, the solid oxide fuel cell system of the conventional technique 2 includes a solid oxide fuel cell (SOFC) stack 1a, a catalyst combustion all-in-one type heat exchanger 2a, and a pre-reformer 3a arranged vertically in a heat insulating container 4a.

The catalyst combustion all-in-one type heat exchanger 2a includes a first heat exchanger 2b provided on the pre-reformer 3a, a catalyst combustion layer 2c provided on the first heat exchanger 2b, a second heat exchanger 2d provided on the catalyst combustion layer 2c.

The fuel flows along a fuel supply line 5c, and the reformed fuel gas is supplied to the SOFC stack 1a. Air as the oxygen-containing gas flows along an air supply line 6a, and is supplied to the SOFC stack 1a. The exhaust fuel is discharged from the SOFC stack 1a through an exhaust fuel line 7g. The exhaust air discharged from the SOFC stack 1a is supplied to an intermediate point in the exhaust fuel line 7g through an exhaust air line 8.

In this structure, the exhaust fuel and the exhaust air from the SOFC stack 1a are supplied to the catalyst combustion layer 2c through the exhaust fuel line 7g and the exhaust air line 8. Then, the combustion gas combusted at the catalyst combustion layer 2c flows from the first heat exchanger 2b toward the pre-reformer 3a, and is used as a heat source for heating the pre-reformer 3a.

The fuel flows toward the pre-reformer 3a through the fuel supply line 5c to generate a reformed gas. Heat exchange between the reformed gas and the combustion gas is performed at the first heat exchanger 2b. Then, heat exchange between the reformed gas and the exhaust air is performed at the second heat exchanger 2d. Thereafter, the reformed gas is supplied to the SOFC stack 1a.

However, in the conventional technique 2, the combustion gas (the combusted exhaust fuel and the combusted exhaust air) is utilized as a heat source for heating the pre-reformer 3a. Thus, the pre-reformer 3a can be damaged easily. The combustion gas has a significantly high temperature, and contains water vapor. Therefore, the combustion gas oxides the pre-reformer 3a easily, and lowers the durability. For this reason, the pre-reformer 3a is made of highly antioxidative material, which is expensive and uneconomical.

SUMMARY OF THE INVENTION

A general object of the present invention is to provide a fuel cell system in which a fuel cell stack and a fluid unit can be installed in a small space advantageously, and to reduce the overall size of the fuel cell system.

Further, a main object of the present invention is to provide a fuel cell system in which exhaust heat from a fuel cell stack is utilized effectively, and to improve the durability of a reformer with an economical structure.

According to the present invention, a fuel cell stack, a heat exchanger, a reformer, and a casing are provided. The fuel cell stack is formed by stacking a plurality of fuel cells in a stacking direction. Each of the fuel cells includes an electrolyte electrode assembly and separators sandwiching the electrolyte electrode assembly. The electrolyte electrode assembly includes an anode, a cathode, and an electrolyte interposed between the anode and the cathode. The heat exchanger heats an oxygen-containing gas to be supplied to the fuel cell stack. The reformer reforms a fuel to produce a fuel gas. The casing contains the fuel cell stack, the heat exchanger, and the reformer. A fluid unit including at least the heat exchanger and the reformer is provided on one side of the fuel cell stack in the casing.

It is preferable that the fluid unit is provided symmetrically with respect to the central axis of the fuel cell stack. Further, it is preferable that, in the fluid unit, the reformer is provided inside the heat exchanger.

It is preferable that a load applying mechanism is provided on the other side of the fuel cell stack for applying a tightening load to the fuel cells in the stacking direction. Further, it is preferable that the load applying mechanism is provided symmetrically with respect to the central axis of the fuel cell stack.

Heat exchange between an exhaust gas discharged from the fuel cell stack and the oxygen-containing gas is performed at the heat exchanger, and after the heat exchange, the oxygen-containing gas heats the reformer, and then, is supplied to the fuel cell stack.

Further, it is preferable that an oxygen-containing gas channel member is provided. The oxygen-containing gas channel member forms a channel for allowing the oxygen-containing gas discharged from the heat exchanger after heat exchange to flow around the reformer. Further, it is preferable that a pipe member is provided for allowing the oxygen-containing gas discharged from the heat exchanger after heat exchange to flow into the reformer.

Further, it is preferable that an exhaust gas channel member is provided. The exhaust gas channel member forms a channel for allowing the exhaust gas discharged from the heat exchanger after heat exchange to flow around the reformer.

Further, it is preferable that the fuel cell stack comprises a fuel gas supply unit extending in the stacking direction for supplying the fuel gas to the anode, and an oxygen-containing gas supply unit extending in the stacking direction for supplying the oxygen-containing gas to the cathode, and the fuel gas supply unit is provided inside the oxygen-containing gas supply unit. Further, it is preferable that the oxygen-containing gas supply unit and the fuel gas supply unit are provided at substantially the center of the fuel cell stack.

In the present invention, since the fluid unit including at least the heat exchanger and the reformer is provided on one side of the fuel cell stack, the heat exchanger and the reformer are provided adjacent to each other. Thus, the fuel cell stack and the fluid unit can be provided in a small space in the casing. Accordingly, reduction in the overall size of the fuel cell system is achieved. Further, since the number of the pipes, and the length of the pipes are reduced effectively, the heat loss is reduced, and power generation is carried out efficiently.

Further, in the present invention, the oxygen-containing gas heated by the heat exchange with the exhaust gas at the heat exchanger is used as a heat source for heating the reformer. Therefore, the exhaust heat from the fuel cell stack is utilized effectively. The reformer is not exposed to the hot exhaust gas, and improvement in the durability of the reformer is achieved. Accordingly, with a simple and economical structure, the desired reforming reaction is performed smoothly.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
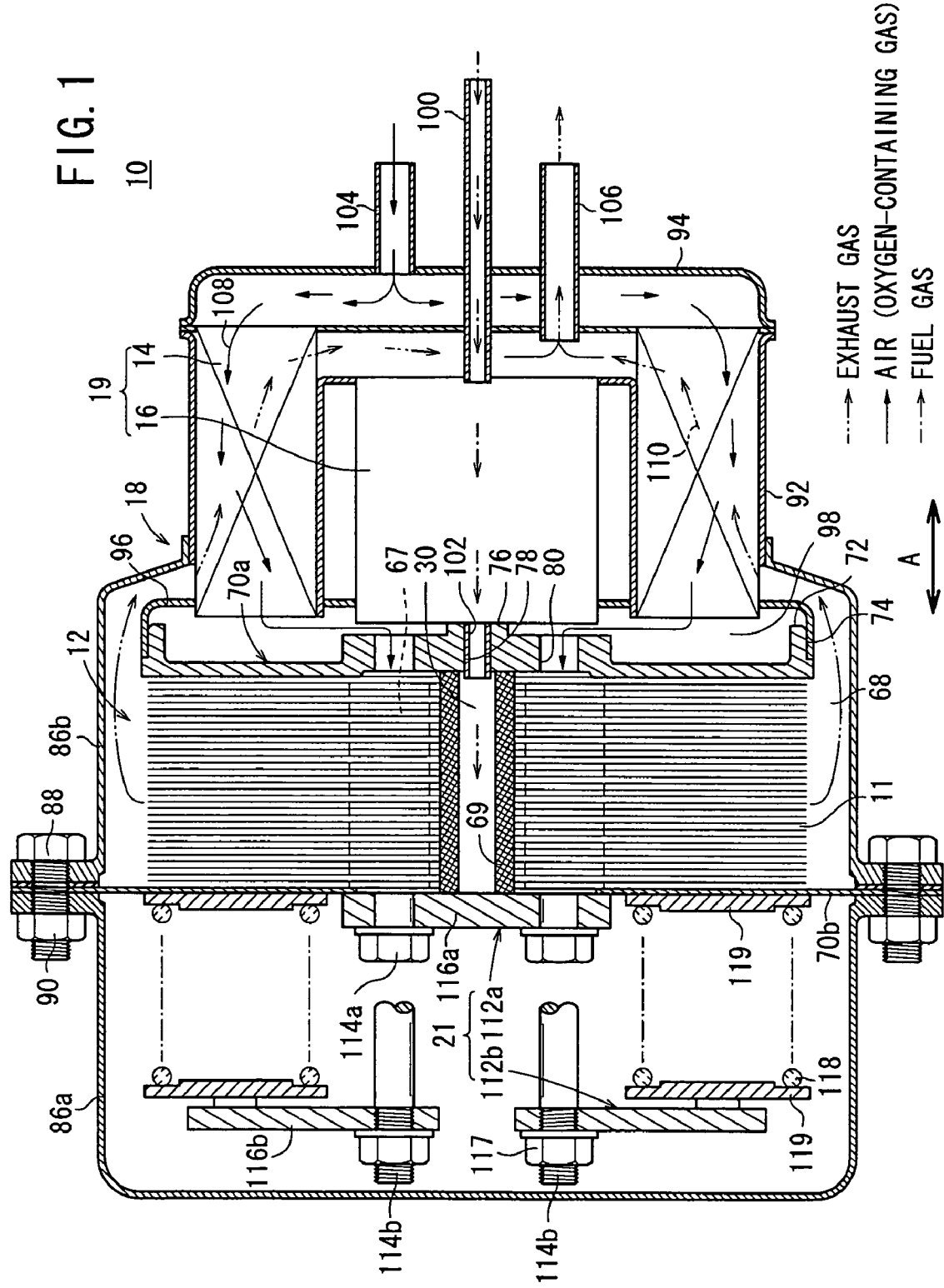
FIG. 1 is a partial cross sectional view showing a fuel cell system according to a first embodiment of the present invention.
Figure 2:
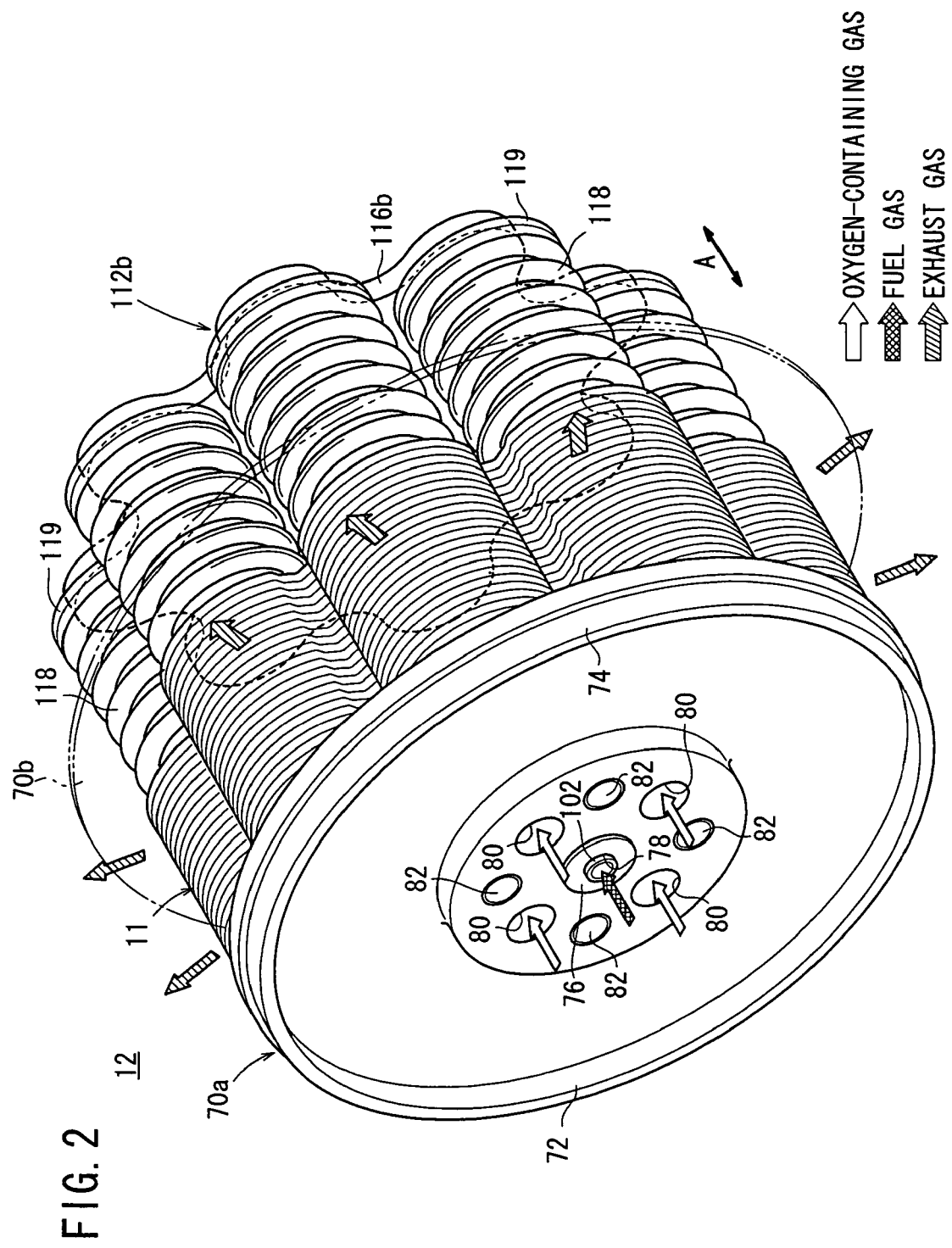
FIG. 2 is a perspective view schematically showing a fuel cell stack of the fuel cell system.

FIG. 1 is a partial cross sectional view showing a fuel cell system 10 according to a first embodiment of the present invention. FIG. 2 is a perspective view schematically showing a fuel cell stack 12 of the fuel cell system 10. The fuel cell stack 12 is formed by stacking a plurality of fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, and a casing 18. The heat exchanger 14 heats the oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
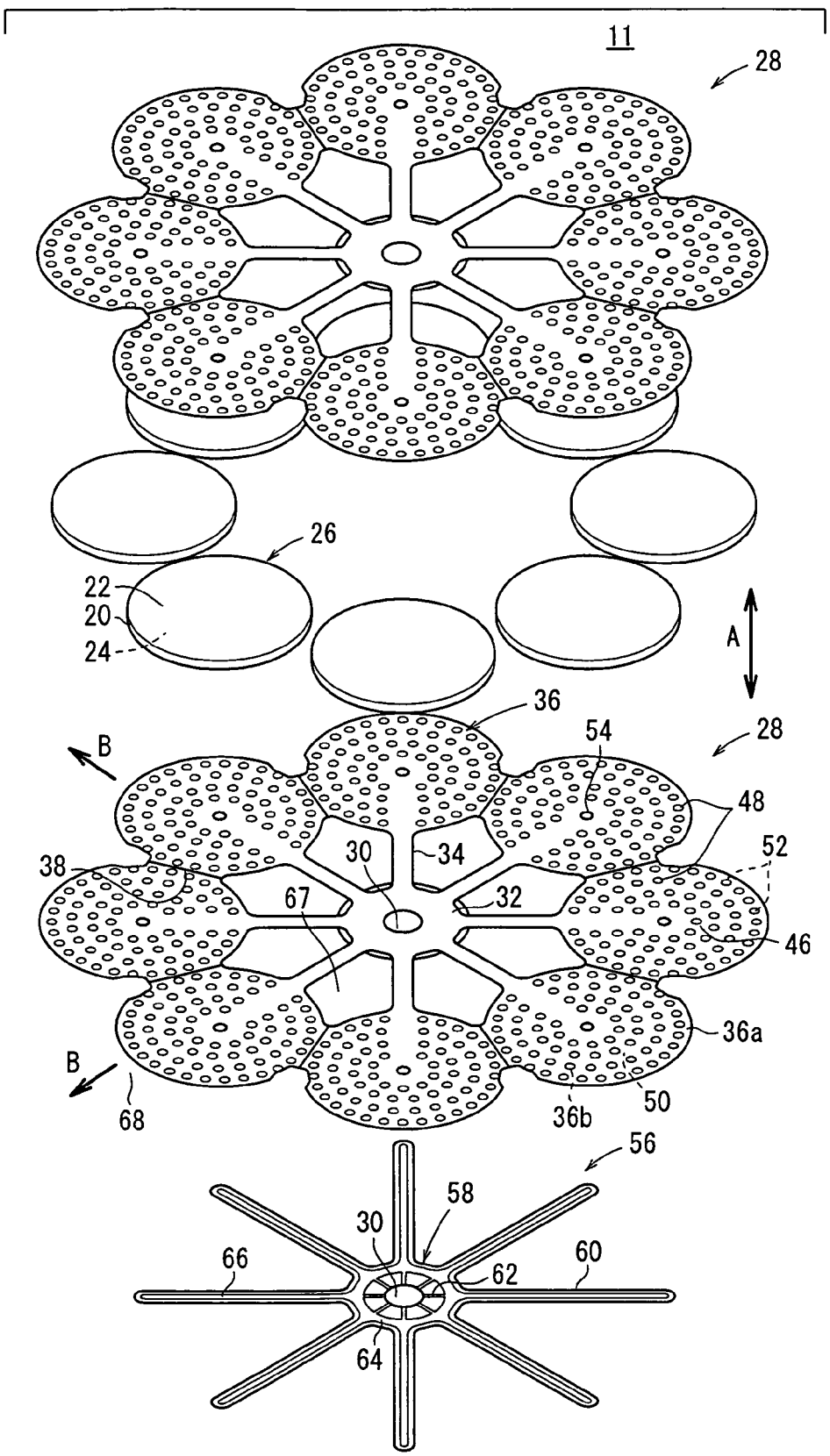
FIG. 3 is an exploded perspective view showing the fuel cell of the fuel cell stack.
Figure 4:
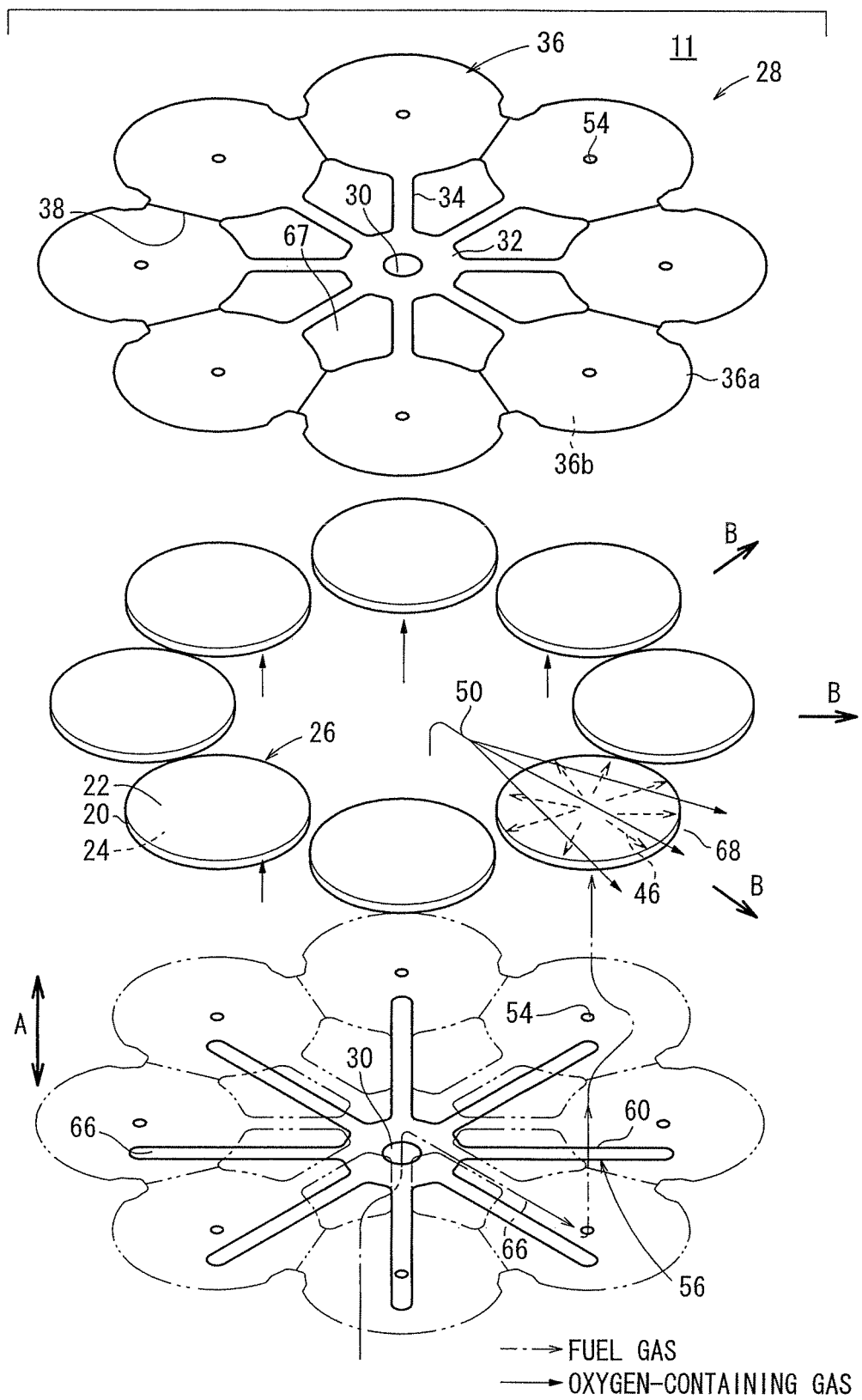
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 (central portion of the separator 28) for preventing the entry of the oxygen-containing gas.

A plurality of, e.g., eight electrolyte electrode assemblies 26 are interposed between a pair of separators 28 to form the fuel cell 11. The eight electrolyte electrode assemblies 26 are concentric with a fuel gas supply passage (fuel gas supply unit) 30 extending through the center of the separators 28.

Figure 5:
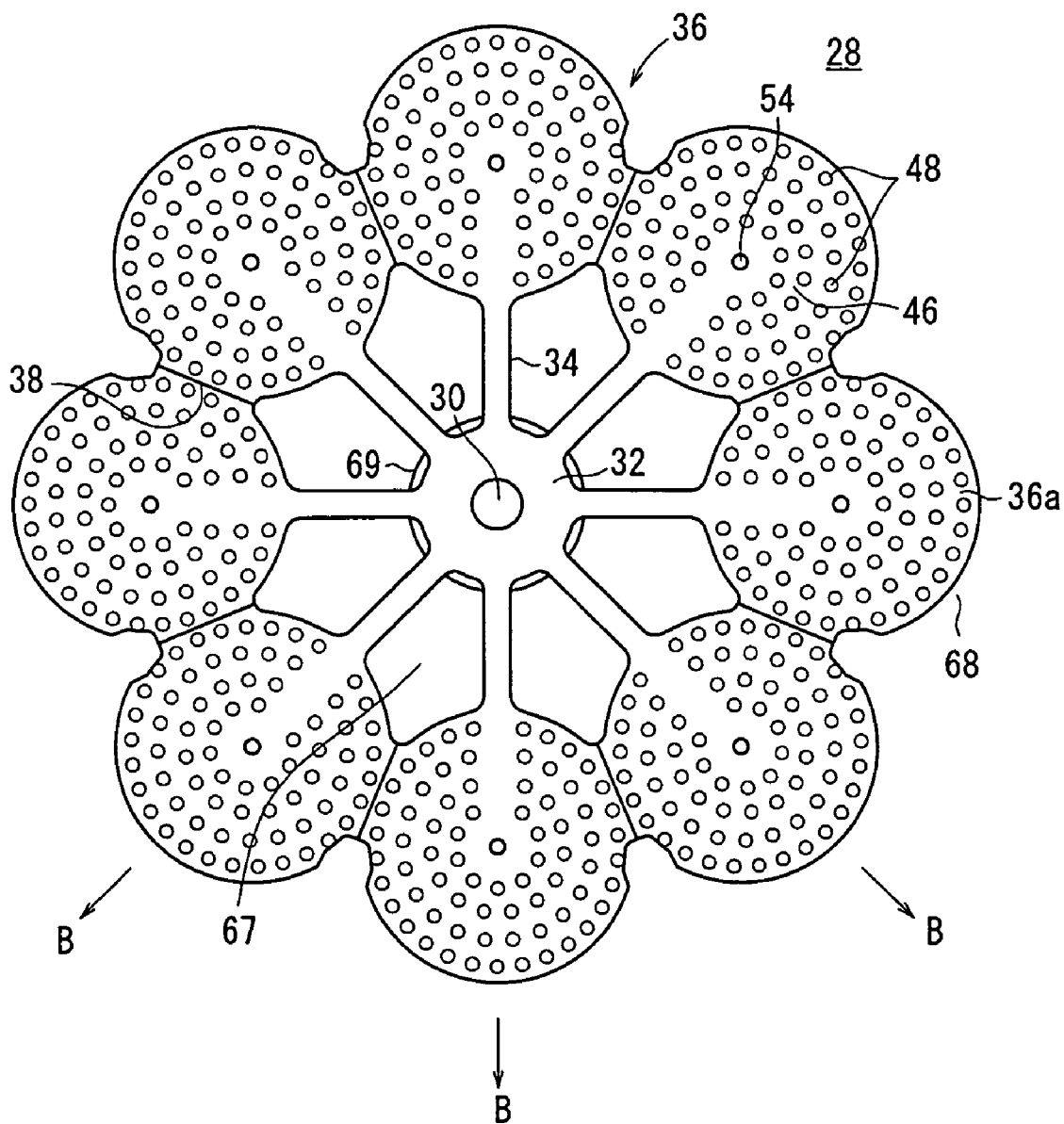
FIG. 5 is a view showing one surface of a separator.
Figure 6:
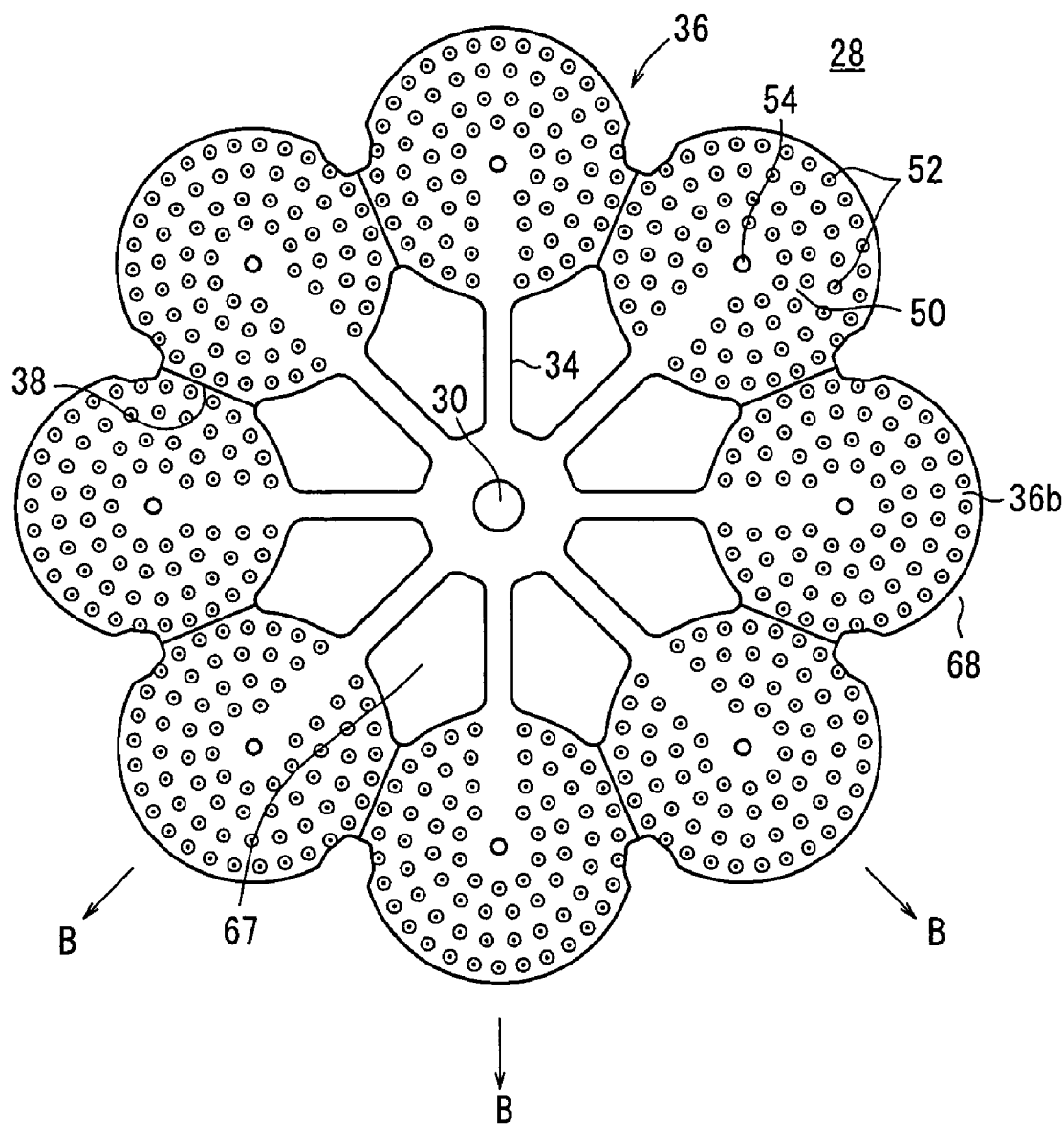
FIG. 6 is a view showing the other surface of the separator.

In FIG. 3, for example, each of the separators 28 comprises a metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. As shown in FIGS. 3, 5, and 6, the adjacent circular disks 36 are separated from each other by slits 38.

Figure 7:
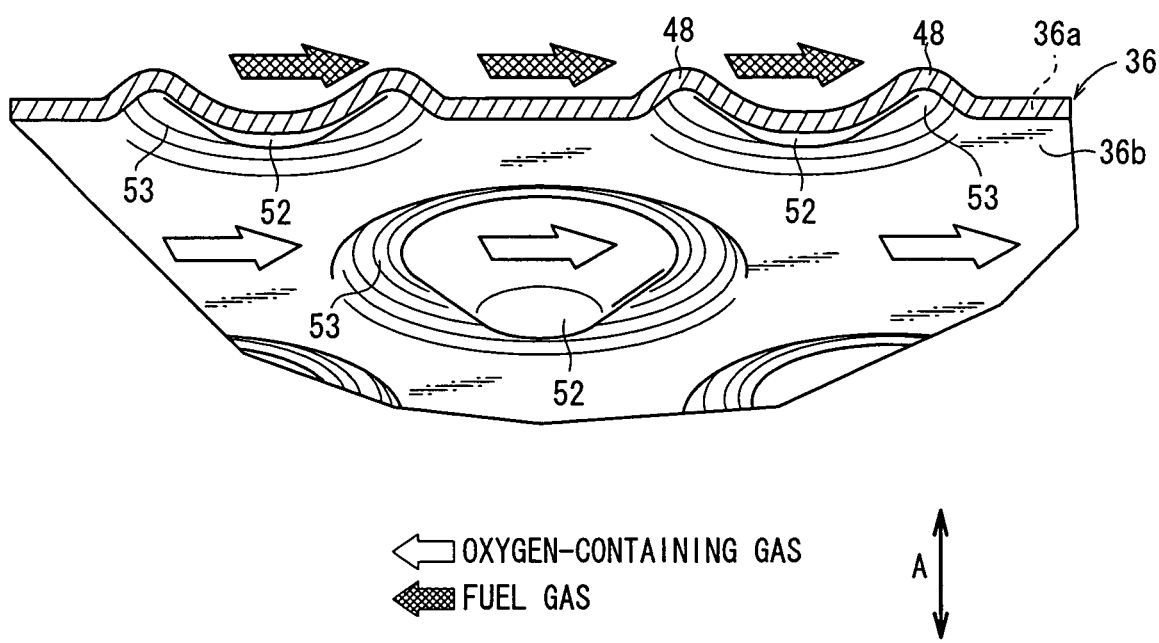
FIG. 7 is a perspective view showing first protrusions and second protrusions formed on the separator.

Each of the circular disks 36 has first protrusions 48 on its surface 36a which contacts the anode 24 (see FIG. 5). The first protrusions 48 form a fuel gas channel 46 for supplying a fuel gas along an electrode surface of the anode 24. Each of the circular disks 36 has second protrusions 52 on its surface 36b which contacts the cathode 22 (see FIG. 6). The second protrusions 52 form an oxygen-containing gas channel 50 for supplying the oxygen-containing gas along an electrode surface of the cathode 22. As shown in FIG. 7, the first protrusions 48 and the second protrusions 52 protrude away from each other.

The first protrusions 48 are ring shaped protrusions, and the second protrusions 52 are mountain shaped protrusions. The second protrusions (mountain shaped protrusions) 52 are surrounded by the first protrusions (ring shaped protrusions) 48. The second protrusions 52 are formed on the surface where recesses 53 corresponding to the first protrusions 48 are formed. Therefore, the second protrusions 52 are provided in the recesses 53.

Figure 8:
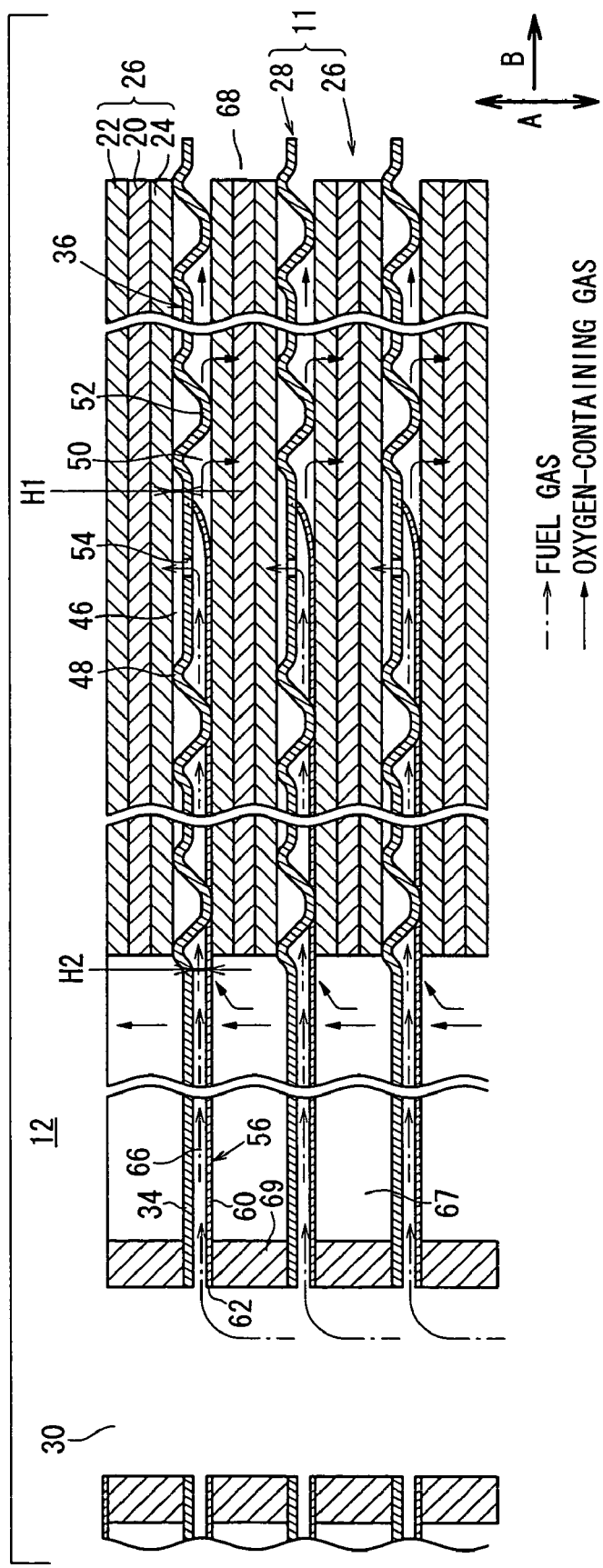
FIG. 8 is a cross sectional view showing the fuel cell stack.
Figure 9:
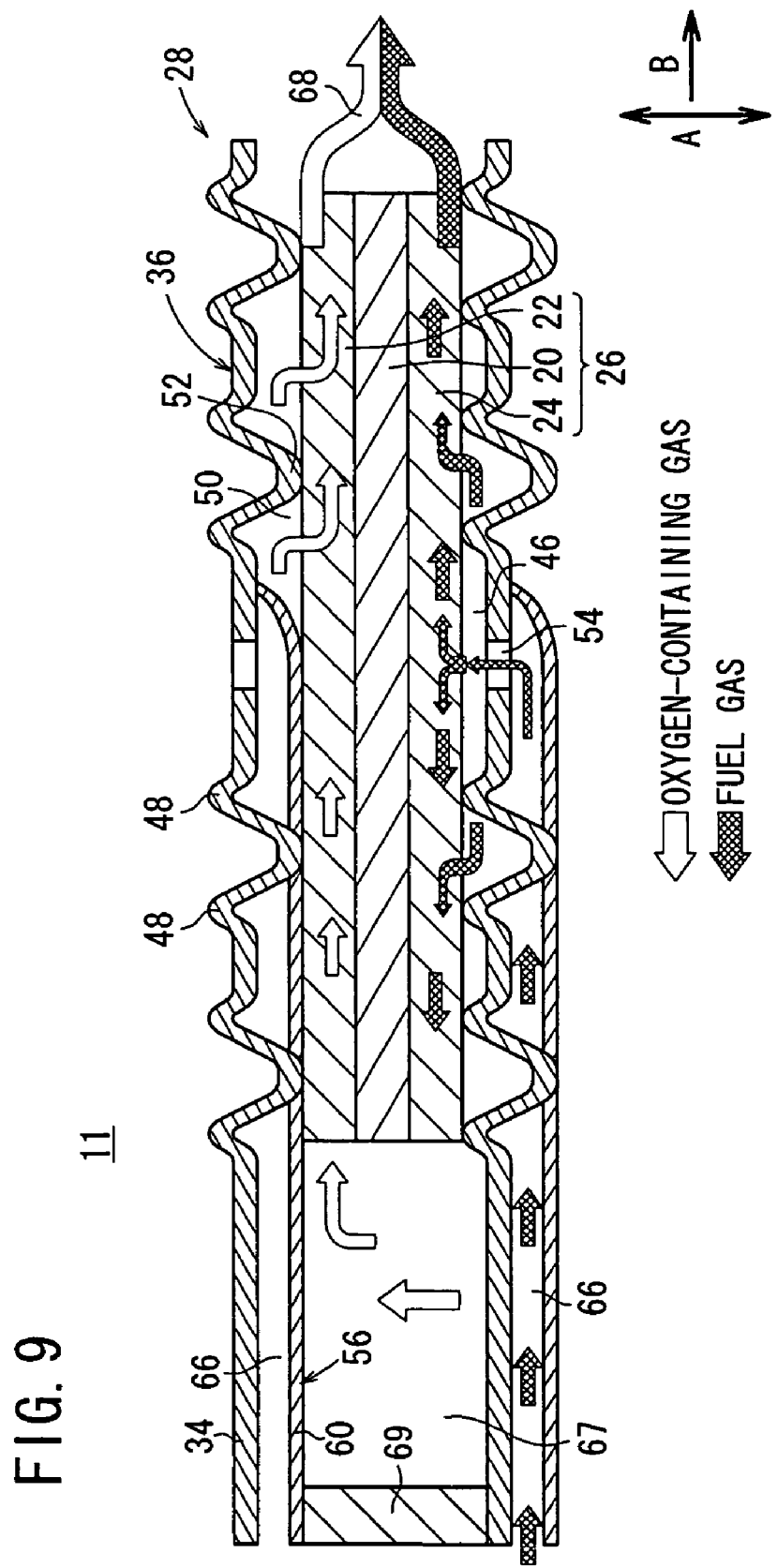
FIG. 9 is a cross sectional view schematically showing operation of the fuel cell.

As shown in FIGS. 8 and 9, a plurality of the first and second protrusions 48, 52 are provided, and the height H1 of the first protrusion 48 is smaller than the height H2 of the second protrusion 52 (H1<H2). Therefore, the volume of the oxygen-containing gas channel 50 is larger than the volume of the fuel gas channel 46.

Alternatively, the first protrusions 48 may be mountain shaped protrusions, and the second protrusions 52 may be ring shaped protrusions. In this structure, it is preferable that the height of the ring shaped protrusions is larger than the height of the mountain shaped protrusions.

As shown in FIGS. 3 to 6, a fuel gas inlet 54 is provided in each of the circular disks 36. The fuel gas flows through the fuel gas inlet 54 into the fuel gas channel 46. The position of the fuel gas inlet 54 is determined so that the fuel gas can be distributed uniformly. For example, the fuel gas inlet 54 is provided at the center of the circular disk 36.

Figure 10:
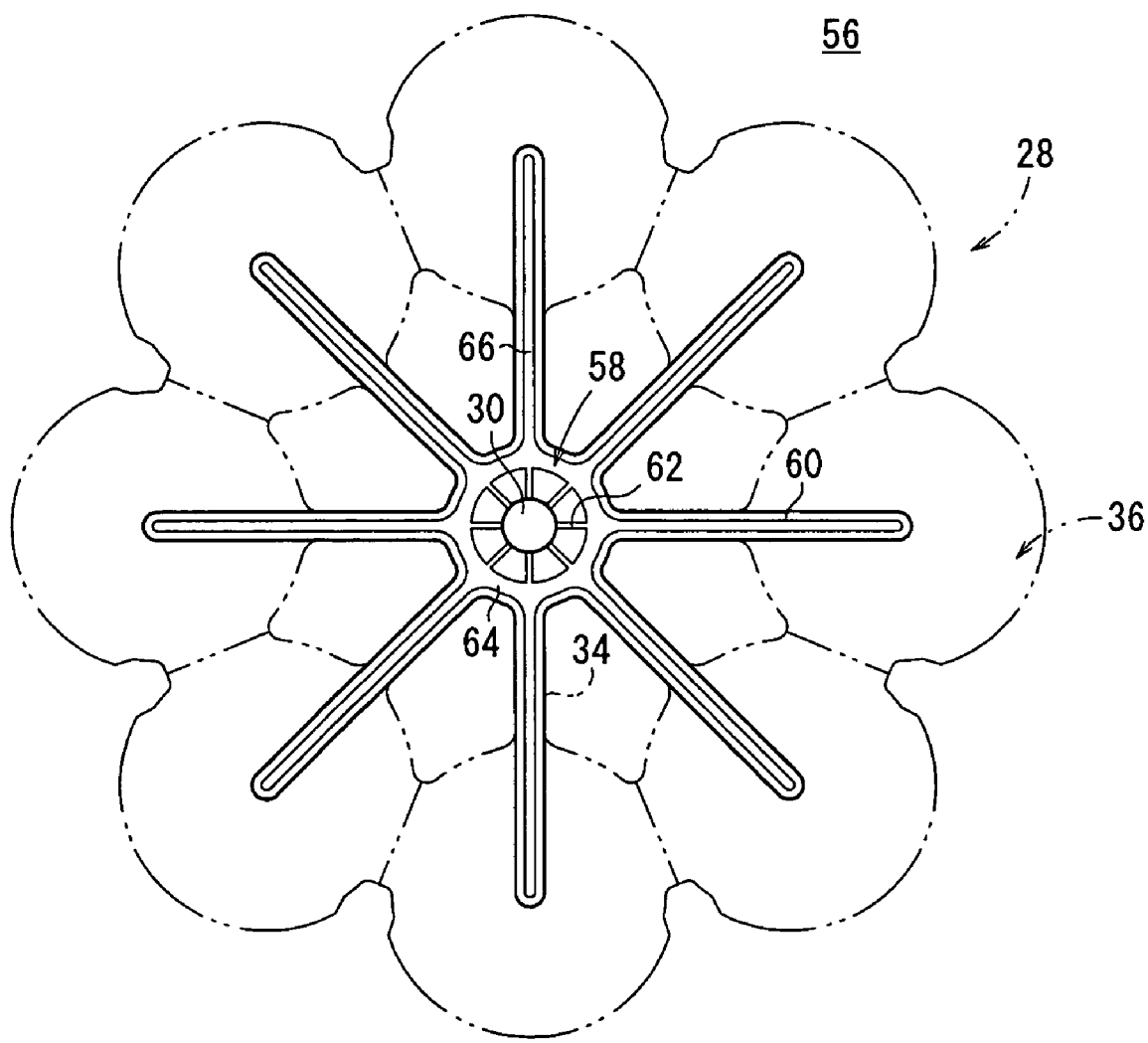
FIG. 10 is view schematically showing a channel member fixed to the separator.

A channel member 56 is fixed to the separator 28 by brazing or laser welding on a surface facing the cathode 22. As shown in FIGS. 3 and 10, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A fuel gas supply channel 66 is formed between the first and second bridges 34, 60. The fuel gas supply channel 66 is connected to the fuel gas channel 46 through the slits 62 and the recess 64.

As shown in FIGS. 8 and 9, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 is formed by spaces between the inner sides of the respective circular disks 36 and the first bridges 34, and extends in the stacking direction.

As shown in FIG. 8, insulating seals 69 for sealing the fuel gas supply passage 30 is provided between the separators 28. For example, the insulating seals 69 are made of mica material, or ceramic material. An exhaust gas channel 68 extends through the fuel cells 11 in the stacking direction outside the respective circular disks 36.

As shown in FIGS. 1 and 2, the fuel cell stack 12 includes a plurality of fuel cells 11 stacked together, and end plates 70a, 70b provided at opposite ends in the stacking direction. The end plate 70a has a substantially circular disk shape. A ring shaped portion 72 is formed in the outer circumferential region of the end plate 70a. The ring shaped portion 72 axially protrudes from the end plate 70a. A groove 74 is formed around the ring shaped portion 72. A columnar protrusion 76 is provided at the center of the ring shaped portion 72. The columnar protrusion 76 and the ring shaped portion 72 protrude from the end plate 70a in the same direction. A hole 78 is formed at the center of the protrusion 76.

Figure 11:
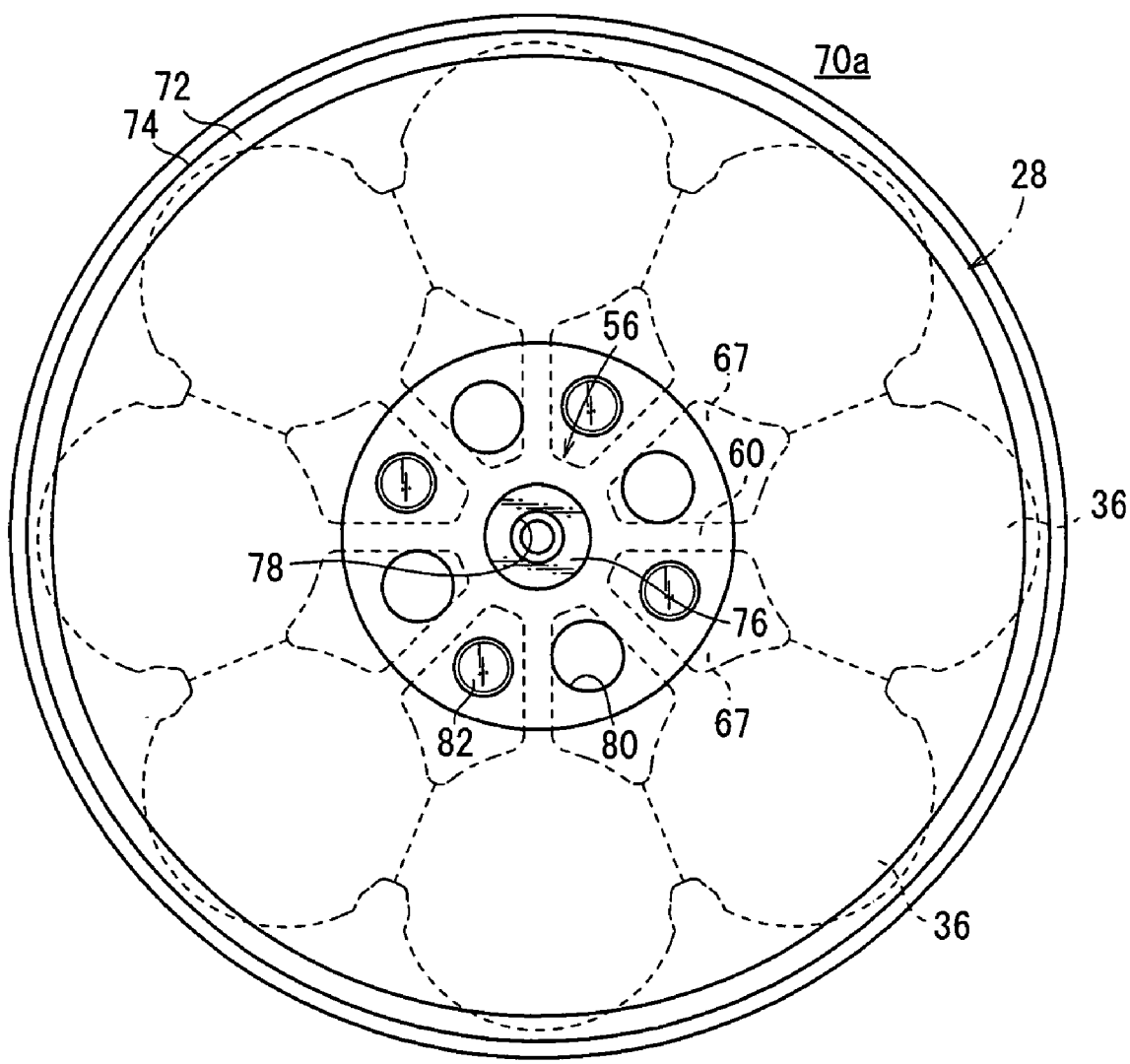
FIG. 11 is a front view showing an end plate of the fuel cell stack.

In the end plate 70a, holes 80 and screw holes 82 are formed alternately along a virtual circle around the protrusion 76. The holes 80 and the screw holes 82 are spaced from each other by predetermined intervals (angles). As shown in FIG. 11, the holes 80 and the screw holes 82 are provided at positions corresponding to respective spaces of the oxygen-containing gas supply unit 67 formed between the first and second bridges 34, 60. As shown in FIG. 1, the diameter of the end plate 70b is larger than the diameter of the end plate 70a. The end plate 70b is a thin electrically conductive plate.

The casing 18 includes a first case unit 86a containing the load applying mechanism 21 and a second case unit 86b containing the fuel cell stack 12. The end plate 70b and an insulating member are sandwiched between the first case unit 86a and the second case unit 86b. The insulating member is provided on the side of the second case unit 86b. The joint portion between the first case unit 86a and the second case unit 86b is tightened by screws 88 and nuts 90.

An end of a ring shaped wall plate 92 of the fluid unit 19 is joined to the second case unit 86b, and a head plate 94 is fixed to the other end of the wall plate 92. The fluid unit 19 is provided symmetrically with respect to the central axis of the fuel cell stack 12. Specially, the substantially cylindrical reformer 16 is provided coaxially inside the substantially ring shaped heat exchanger 14. The heat exchanger 14 and the reformer 16 are fixed to a wall plate 96, and the wall plate 96 is fixed to the groove 74 around the end plate 70a. A chamber 98 is formed between the end plate 70a and the wall plate 96.

A fuel gas supply pipe 100 and a reformed gas supply pipe 102 are connected to the reformer 16. The fuel gas supply pipe 100 extends to the outside from the head plate 94. The reformed gas supply pipe 102 is inserted into the hole 78 of the end plate 70a, and connected to the fuel gas supply passage 30.

An air supply pipe 104 and an exhaust gas pipe 106 are connected to the head plate 94. A channel 108 extending from the air supply pipe 104 to the chamber 98 through the heat exchanger 14 and a channel 110 extending from the exhaust gas channel 68 of the fuel cell stack 12 to the exhaust gas pipe 106 through the heat exchanger 14 are provided in the casing 18.

The load applying mechanism 21 includes a first tightening unit 112a for applying a first tightening load T1 to a region around (near) the fuel gas supply passage 30 and a second tightening unit 112b for applying a second tightening load T2 to the electrolyte electrode assemblies 26. The second tightening load T2 is smaller than the first tightening load T1 (T1>T2).

Figure 12:
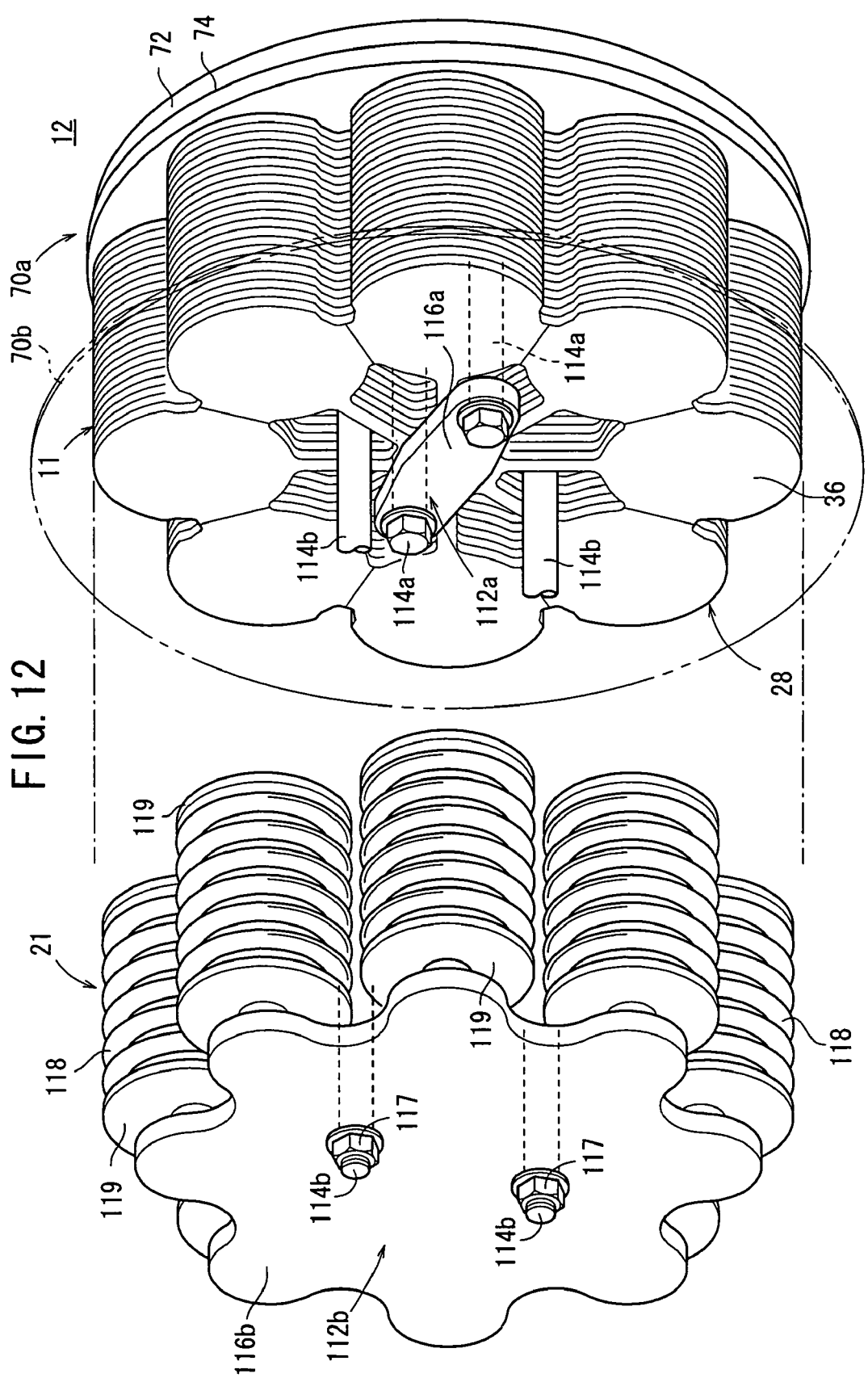
FIG. 12 is a partial exploded perspective view showing a load applying mechanism of the fuel cell system.

As shown in FIGS. 1, 2, and 12, the first tightening unit 112a includes short first tightening bolts 114a screwed into the screw holes 82 provided along one diagonal line of the end plate 70a. The first tightening bolts 114a extend in the stacking direction of the fuel cells 11, and engage a first presser plate 116a. The first presser plate 116a is a narrow plate, and engages the central position of the separator 28 to cover the fuel gas supply passage 30. The first tightening bolts 114a are provided in the oxygen-containing gas supply unit 67 in the separators 28.

The second tightening unit 112b includes long second tightening bolts 114b screwed into the screw holes 82 provided along the other diagonal line of the end plate 70a. Ends of the second tightening bolts 114b extend through a second presser plate 116b having a curved outer section. Nuts 117 are fitted to the ends of the second tightening bolts 114b. The second tightening bolts 114b are provided in the oxygen-containing gas supply unit 67 in the separators 28. The thickness of the second presser plate 116b in the stacking direction is small in comparison with the first presser plate 116a.

Springs 118 and spring seats 119 are provided in respective circular portions of the second presser plate 116b, at positions corresponding to the electrolyte electrode assemblies 26 on the circular disks 36 of the fuel cell 11. For example, the springs 118 are ceramics springs.

Operation of the fuel cell system 10 will be described below.

As shown in FIG. 3, in assembling the fuel cell system 10, firstly, the separator 28 is joined to the channel member 56 on its surface facing the cathode 22. Therefore, the fuel gas supply channel 66 connected to the fuel gas supply passage 30 is formed between the separator 28 and the channel member 56. The fuel gas supply channel 66 is connected to the fuel gas channel 46 through the fuel gas inlet 54 (see FIG. 8). The ring shaped insulating seal 69 is provided on each of the separators 28 around the fuel gas supply passage 30.

In this manner, the separator 28 is fabricated. Eight electrolyte electrode assemblies 26 are interposed between the separators 28 to form the fuel cell 11. As shown in FIGS. 3 and 4, the electrolyte electrode assemblies 26 are interposed between the surface 36a of one separator 28 and the surface 36b of the other separator 28. The fuel gas inlet 54 of the circular disk 36 is positioned at the center in each of the anodes 24.

A plurality of the fuel cells 11 are stacked in the direction indicated by the arrow A, and the end plates 70a, 70b are provided at opposite ends in the stacking direction. As shown in FIGS. 1 and 12, the first presser plate 116a of the first tightening unit 112a is provided a the center of the fuel cell 11.

In this state, the short first tightening bolts 114a are inserted through the first presser plate 116a and the end plate 70b toward the end plate 70a. Tip ends of the first tightening bolts 114a are screwed into, and fitted to the screw holes 82 formed along one of the diagonal lines of the end plate 70a. In this manner, in the fuel cell stack 12, the first tightening load T1 is applied to the region near the fuel gas supply passage 30.

Then, the springs 118 and the spring seats 119 are aligned axially with the electrolyte electrode assemblies 26 at respective positions of the circular disks 36. The second presser plate 116b of the second tightening unit 112b engage the spring seats 119 provided at one end of the springs 118.

The long second tightening bolts 114b are inserted through the second presser plate 116b and the end plate 70b toward the end plate 70a. The tip end of the second tightening bolts 114b are screwed into, and fitted to the screw holes 82 formed along the other diagonal line of the end plate 70a. The nuts 117 are fitted to the heads of the second tightening bolts 114b. Therefore, by adjusting the state of the screw engagement between the nuts 117 and the second tightening bolts 114b, the second tightening load T2 is applied to the electrolyte electrode assemblies 26 by the elastic force of the respective springs 118.

The end plate 70b of the fuel cell stack 12 is sandwiched between the first case unit 86a and the second case unit 86b of the casing 18. The first case unit 86a and the second case unit 86b are fixed together by the screws 88 and the nuts 90. The fluid unit 19 is mounted in the second case unit 86b. The wall plate 96 of the fluid unit 19 is attached to the groove 74 around the end plate 70a. Thus, the chamber 98 is formed between the end plate 70a and the wall plate 96.

In the fuel cell system 10, as shown in FIG. 1, a fuel (methane, ethane, propane, or the like) and, as necessary, water are supplied from the fuel gas supply pipe 100, and an oxygen-containing gas (hereinafter referred to as "air") is supplied from the air supply pipe 104.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slit 62 in the separator 28 of each fuel cell 11 (see FIG. 8).

The fuel gas flows along the fuel gas supply channel 66 between the first and second bridges 34, 60, and flows into the fuel gas channel 46 from the fuel gas inlets 54 of the circular disks 36. The fuel gas inlets 54 are formed at positions corresponding to central regions of the anodes 24 of the electrolyte electrode assemblies 26. Thus, the fuel gas is supplied from the fuel gas inlets 54 to the substantially central positions of the anodes 24, and flows outwardly from the central regions of the anodes 24 along the fuel gas channel 46 (see FIG. 9).

As shown in FIG. 1, air from the air supply pipe 104 flows through the channel 108 of the heat exchanger 14, and temporarily flows into the chamber 98. The air flows through the holes 80 connected to the chamber 98, and is supplied to the oxygen-containing gas supply unit 67 provided at substantially the center of the fuel cells 11. At this time, in the heat exchanger 14, as described later, since the exhaust gas discharged to the exhaust gas channel 68 flows through the channel 110, heat exchange between the air before supplied to the fuel cells 11 and the exhaust gas is performed. Therefore, the air is heated to a desired fuel cell operating temperature beforehand.

The oxygen-containing gas supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 9, in the oxygen-containing gas channel 50, the air flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22 (see FIG. 9). At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the channel 110 of the heat exchanger 14, heat exchange between the exhaust gas and the air is carried out. Then, the exhaust gas is discharged into the exhaust gas pipe 106.

In the first embodiment, the fluid unit 19 including the heat exchanger 14 and the reformer 16 are provided together on one side of the fuel cell stack 12 (see FIG. 1). The heat exchanger 14 and the reformer 16 are adjacent to each other. Therefore, the fuel cell stack 12 and the fluid unit 19 are accommodated in a small space in the casing 18. Thus, reduction in the overall size of the fuel cell system 10 is achieved easily.

Further, the heat exchanger 14 is directly connected to the end plate 70a through the wall plate 96. Therefore, the number of pipes, and the length of pipes in the fuel cell system 10 are reduced effectively. Heat loss is reduced, and the power generation is performed efficiently.

In the first embodiment, the fluid unit 19 is provided symmetrically with respect to the central axis of the fuel cell stack 12. Therefore, there is no temperature distribution in the circumferential direction of the fluid unit 19 and the fuel cell stack 12. That is, uniform temperature in the circumferential direction of the fluid unit 19 and the fuel cell stack 12 is achieved. Accordingly, it is possible to prevent the fuel cells 11 from being damaged by heat stress, and improvement in the durability of the fuel cells 11 is achieved easily. In this structure, the reformer 16 is provided inside the heat exchanger 14. Therefore, heat insulating performance for the reformer 16 is improved. It is possible to utilize the exhaust heat (exhaust gas) from the fuel cells 11, and improve the thermal efficiency.

Further, the load applying mechanism 21 is provided on the other side of the fuel cell stack 12. The load applying mechanism 21 is spaced away from the fluid unit 19, and the fuel cell stack 12 is interposed between the load applying mechanism 21 and the fluid unit 19. Therefore, the load applying mechanism 21 is not exposed to high temperature. Thus, the load applying mechanism 21 can apply the load stably to the fuel cell stack 12. Improvement in the durability of the load applying mechanism 21 is achieved. The load applying mechanism 21 is provided symmetrically with respect to the central axis of the fuel cell stack 12. Therefore, the load is applied uniformly to the fuel cell stack 12, and improvement in the reliability is achieved.

Further, in the first embodiment, heat exchange is performed between the exhaust gas discharged from the fuel cell stack 12 and the air (oxygen-containing gas before consumed in reaction) at the heat exchanger 14. Therefore, the hot air heated by the heat exchange flows through the chamber 98. After the hot air heats the reformer 16 near the chamber 98, the air is supplied to the fuel cell stack 12.

That is, the air which is heated in the heat exchange with the exhaust gas at the heat exchanger 14 is used as a heat source for heating the reformer 16. Therefore, the exhaust heat from the fuel cell stack 12 is utilized effectively. The reformer 16 is not exposed to the hot exhaust gas, and improvement in the durability of the reformer 16 is achieved.

Thus, in the fuel cell system 10, with a simple and economical structure, the desired reforming reaction is smoothly performed. Further, the reformer 16 can be used suitably for a long period of time.

Further, the heat exchanger 14 and the reformer 16 are provided near the fuel cell stack 12, and the reformer 16 is provided inside the heat exchanger 14. Thus, heat radiation is suppressed, and improvement in the thermal efficiency is achieved even more easily.

Further, in the fuel cell stack 12, the fuel gas supply passage 30 is provided inside the oxygen-containing gas supply unit 67. Therefore, corrosion or the like of the fuel gas supply passage 30 is suppressed. Improvement in the durability of the fuel gas supply passage 30 is achieved, and leakage of the fuel gas is suppressed.

Further, the fuel gas supply passage 30 and the oxygen-containing gas supply unit 67 are provided at substantially the central part of the fuel cell stack 12. The heated air and the fuel gas are supplied to the central part of the fuel cell stack 12. Therefore, in each of the fuel cells 11, the heat is transmitted from the central part to the outer part, and the heat is utilized effectively. Accordingly, improvement in the thermal efficiency is achieved.

Figure 13:
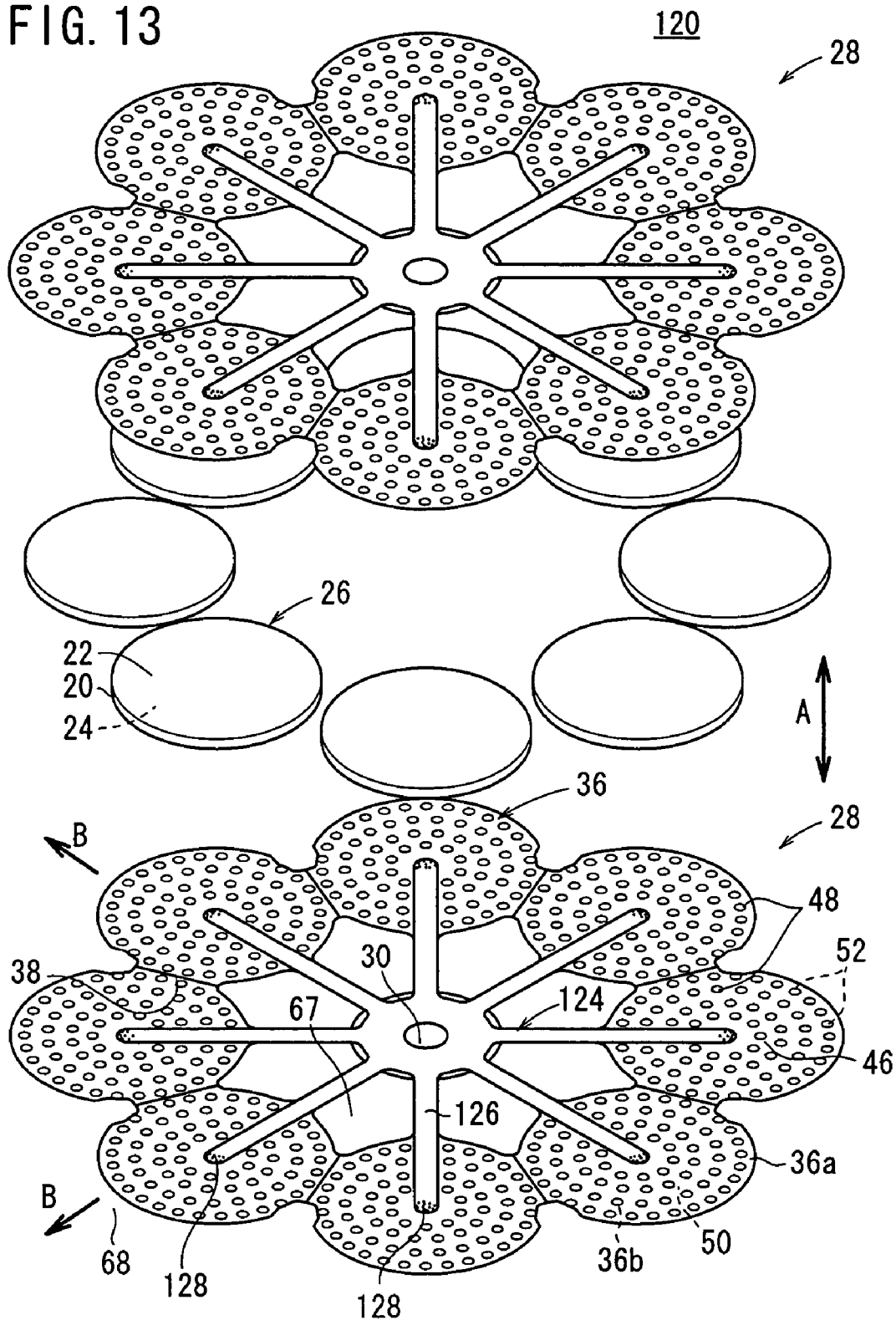
FIG. 13 is an exploded perspective view showing a fuel cell of a fuel cell system according to a second embodiment of the present invention.
Figure 14:
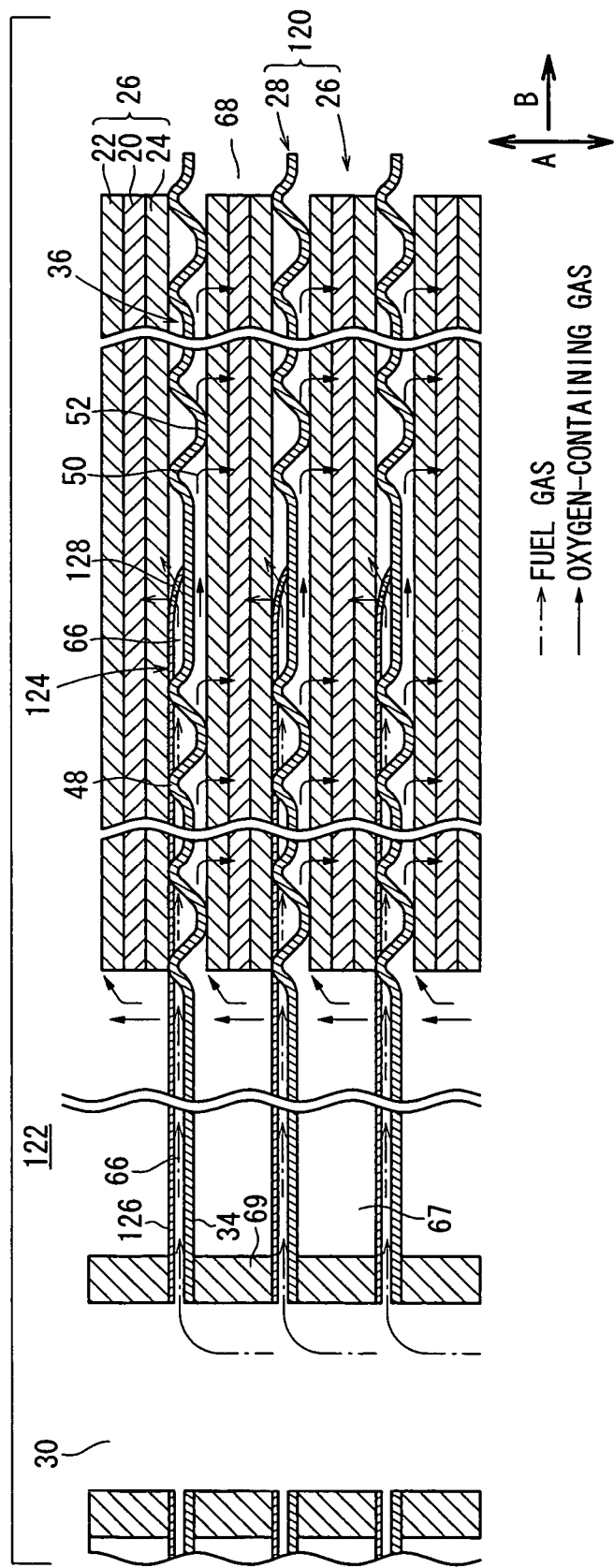
FIG. 14 is a cross sectional view showing a fuel cell stack formed by stacking a plurality of the fuel cells.
Figure 15:
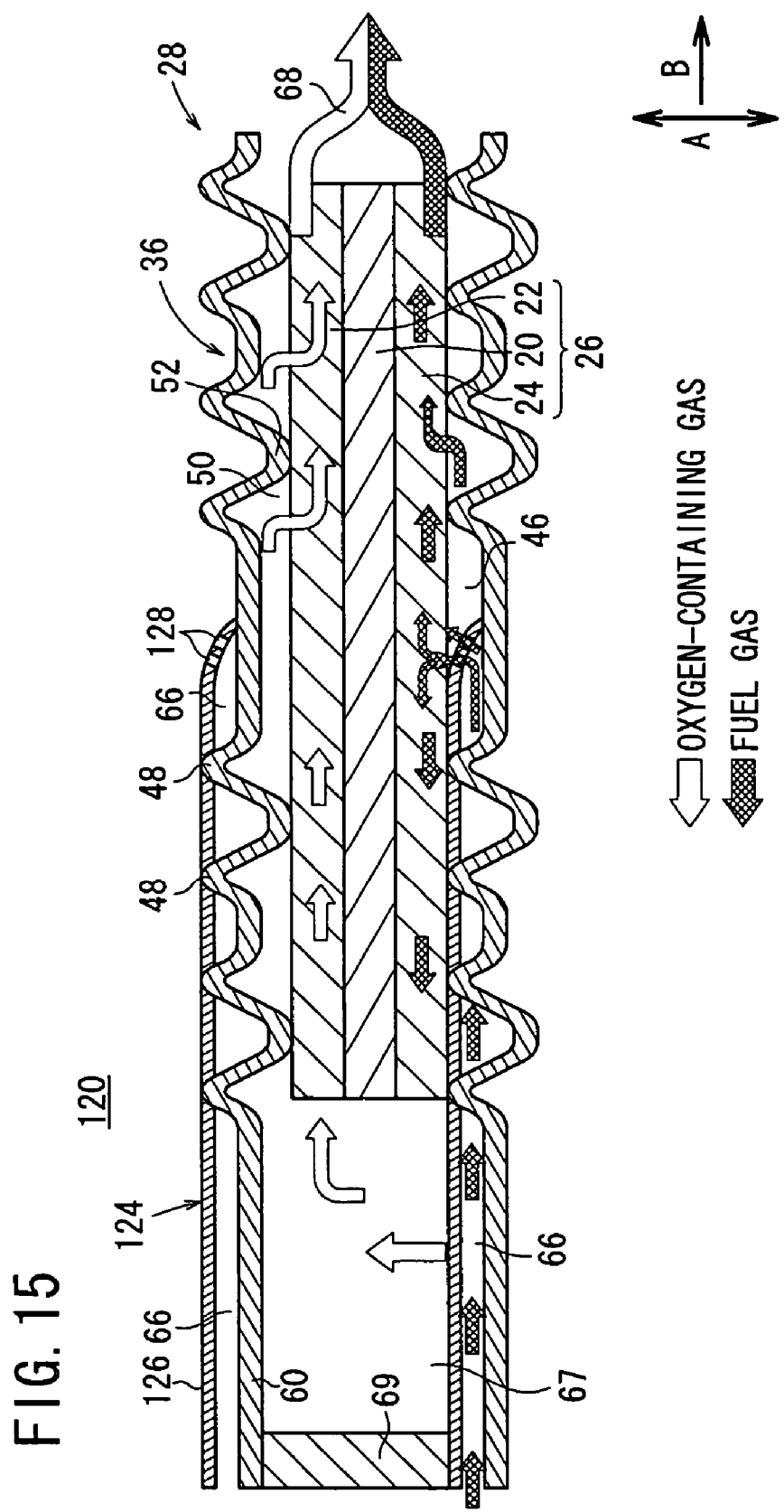
FIG. 15 is a cross sectional view schematically showing operation of the fuel cell.

FIG. 13 is an exploded perspective view showing a fuel cell 120 of a fuel cell system according to a second embodiment of the present invention. FIG. 14 is a cross sectional view showing a fuel cell stack 122 formed by stacking a plurality of the fuel cells 120. FIG. 15 is a cross sectional view schematically showing operation of the fuel cell 120. The constituent elements that are identical to those of the fuel cell 11 according to the first embodiment are labeled with the same reference numeral, and description thereof will be omitted. Also in third and fourth embodiments, the constituent elements that are identical to those of the fuel cell 11 according to the first embodiment are labeled with the same reference numeral, and description thereof will be omitted.

A channel member 124 is fixed to each of separators 28 of the fuel cell 120 on a surface facing the anode 24. The channel member 124 includes second bridges 126 fixed to first bridges 34 of the separator 28. A fuel gas supply channel 66 is formed between the first bridges 34 and the second bridges 126. The second bridges 126 terminate at positions corresponding to substantially central regions of the anodes 24 of the electrolyte electrode assemblies 26. At the ends of the second bridges 126, a plurality of fuel gas inlets 128 are formed. The fuel gas inlets 128 are opened to the anodes 24. The fuel gas inlets 54 according to the first embodiment are not formed in the circular disks 36 of the separators 28.

In the second embodiment, the fuel gas supplied to the fuel gas supply passage 30 flows along the fuel gas supply channel 66 formed between each separator 28 and the channel member 124. Then, the fuel gas is supplied to the anodes 24 from the fuel gas inlets 128 formed at the ends of the channel member 124.

Thus, the fuel gas is supplied from the central regions to the outer regions of the anodes 24 even more suitably and uniformly, and power generation efficiency is improved. Further, since no fuel gas inlets are required in the circular disks 36 of the separators 28, the structure of the separator 28 is simplified, and reduction in the production cost is achieved easily.

Figure 16:
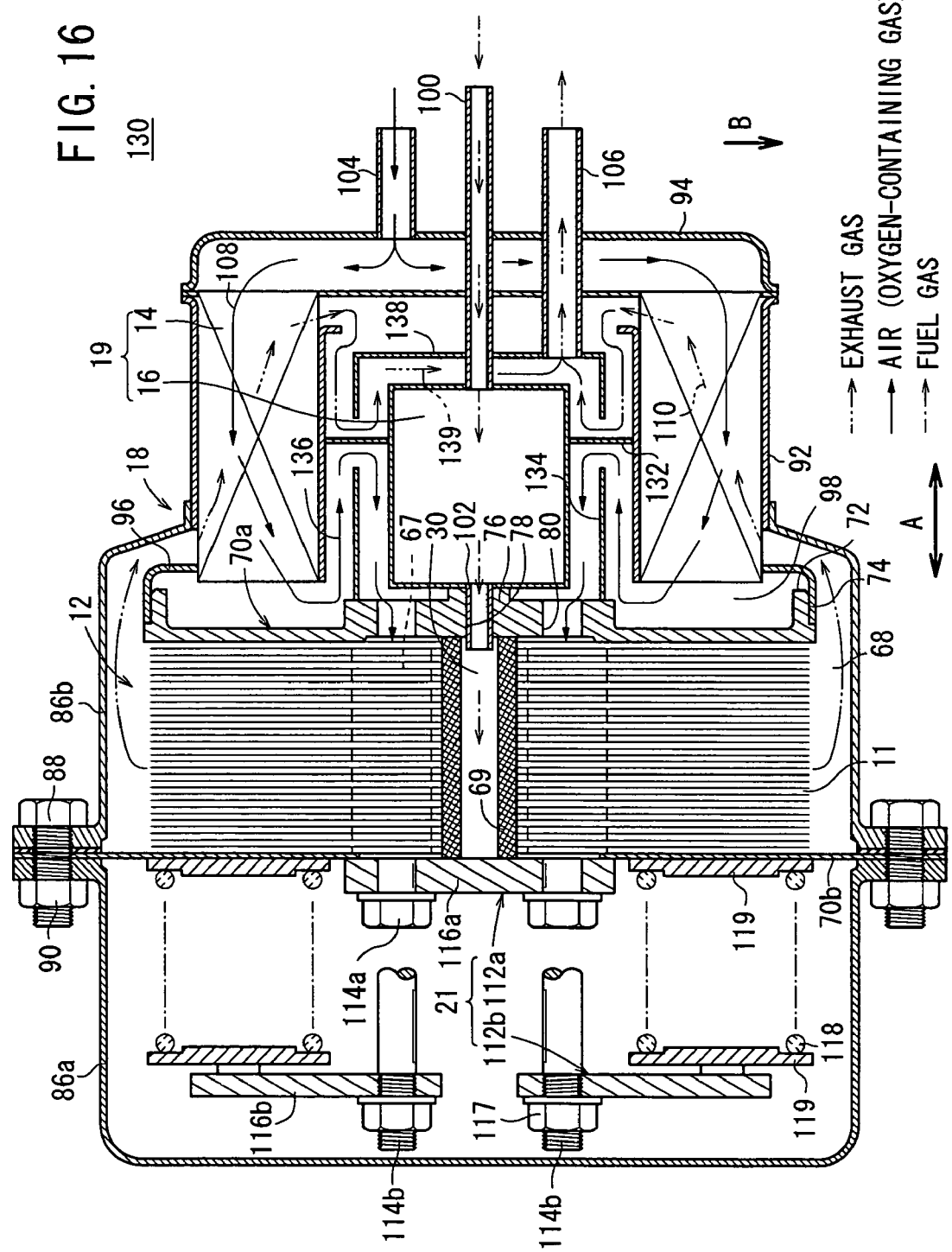
FIG. 16 is a partial cross sectional view showing a fuel cell system according to a third embodiment of the present invention.

FIG. 16 is a partial cross sectional view showing a fuel cell system 130 according to the third embodiment of the present invention.

In the fuel cell system 130, the reformer 16 is provided inside the heat exchanger 14, and a partition wall 132 extending in a direction indicated by an arrow B is connected to the outer circumferential portion of the reformer 16 and the inner circumferential portion of the heat exchanger 14. The partition wall 132 is made of a substantially ring-shaped plate member.

A first channel member (oxygen-containing gas channel member) 134 is provided at the end plate 70a. The first channel member 134 protrudes coaxially with the protrusion 76. The first channel member 134 and the protrusion 76 protrude in the same direction indicated by the arrow A. The first channel member 134 has a ring shape, and the end of the first channel member 134 is positioned near the partition wall 132. By providing the first channel member 134, a first channel 136 is formed in the casing 18. After the heat exchange, the air is discharged from the heat exchanger 14, and flows through the first channel 136 around the reformer 16. The first channel 136 is connected to the channel 108 and the hole 80.

A second channel member (exhaust gas channel member) 138 is provided oppositely to the first channel member 134 such that the partition wall 132 is interposed between the first channel member 134 and the second channel member 138. The second channel member 138 has a cylindrical shape having a bottom. A fuel gas supply pipe 100 is connected to the bottom of the second channel member 138 in a central region, and an exhaust gas pipe 106 is connected to the bottom of the second channel member 138 in a marginal region. By providing the second channel member 138, a second channel 139 is formed in the casing 18. After the heat exchange, the exhaust gas is discharged from the heat exchanger 14, and flows through the second channel 139 around the reformer 16. The second channel 139 is connected to the channel 110 and the exhaust gas pipe 106.

In the third embodiment, the air supplied to the air supply pipe 104 flows through the channel 108 of the heat exchanger 14. Then, the air is supplied to the first channel 136. In this structure, the exhaust gas discharged from the fuel cell stack 12 flows into the channel 110 of the heat exchanger 14, and heat exchange between the air and the exhaust gas is performed.

Thus, the hot air after the heat exchange flows through the first channel 136. The hot air flows around the reformer 16 for suitably heating the reformer 16. Thus, the same advantages as in the case of the first embodiment can be achieved. For example, the exhaust heat from the fuel cell stack 12 is utilized effectively, and the durability of the reformer 16 is improved advantageously.

After the heat exchange at the heat exchanger 14, the exhaust gas flows through the second channel 139 formed by the second channel member 138, and flows around the end of the reformer 16. Then, the exhaust gas is discharged from the exhaust gas pipe 106. The exhaust gas after the heat exchange at the heat exchanger 14 can be utilized again as a heat source for heating the reformer 16. Thus, the exhaust heat can be utilized even more effectively.

Figure 17:
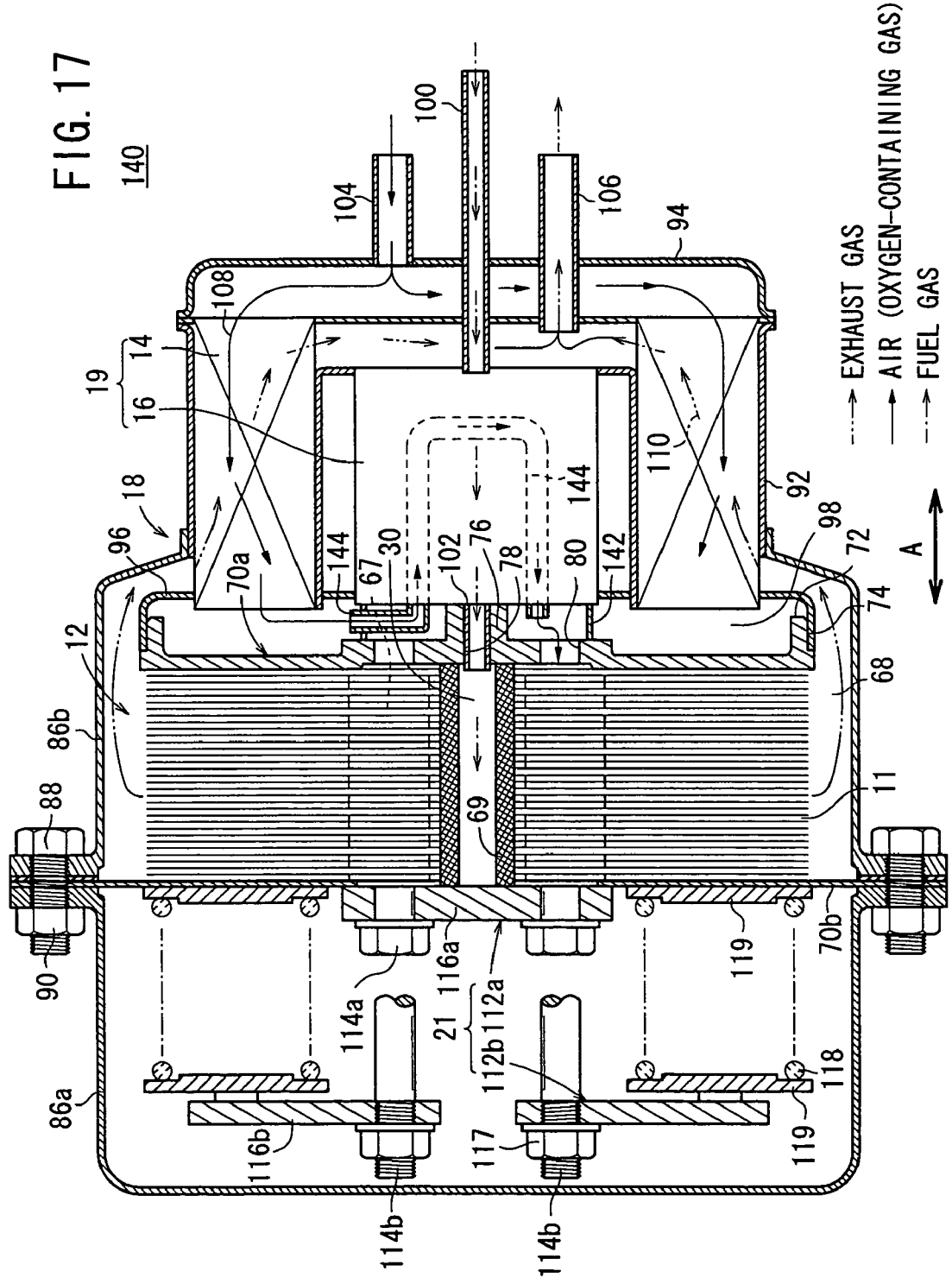
FIG. 17 is a partial cross sectional view showing a fuel cell system according to a fourth embodiment of the present invention.
Figure 18:
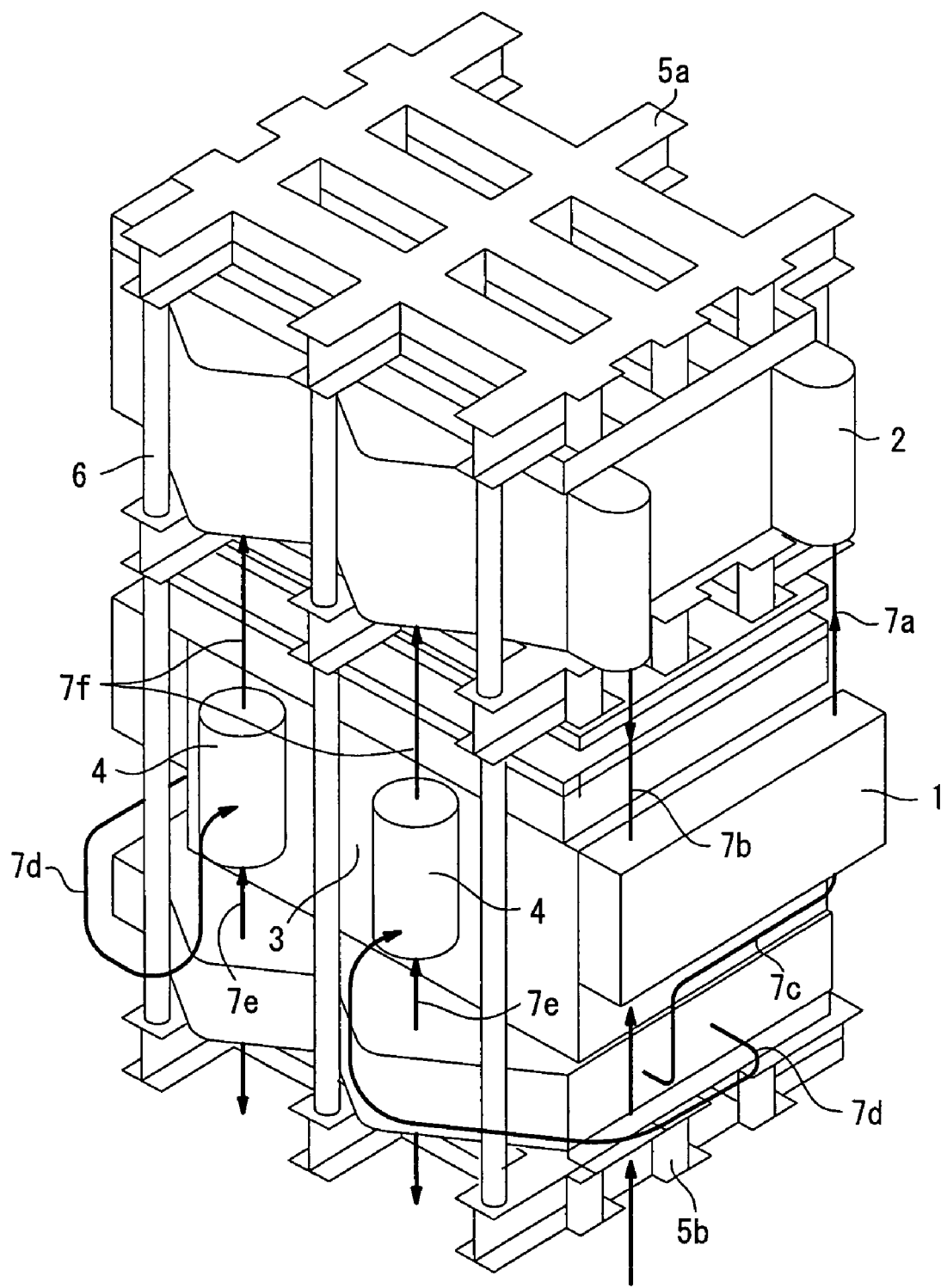
FIG. 18 is a perspective view showing a fuel cell power generation apparatus according to a conventional technique 1.
Figure 19:
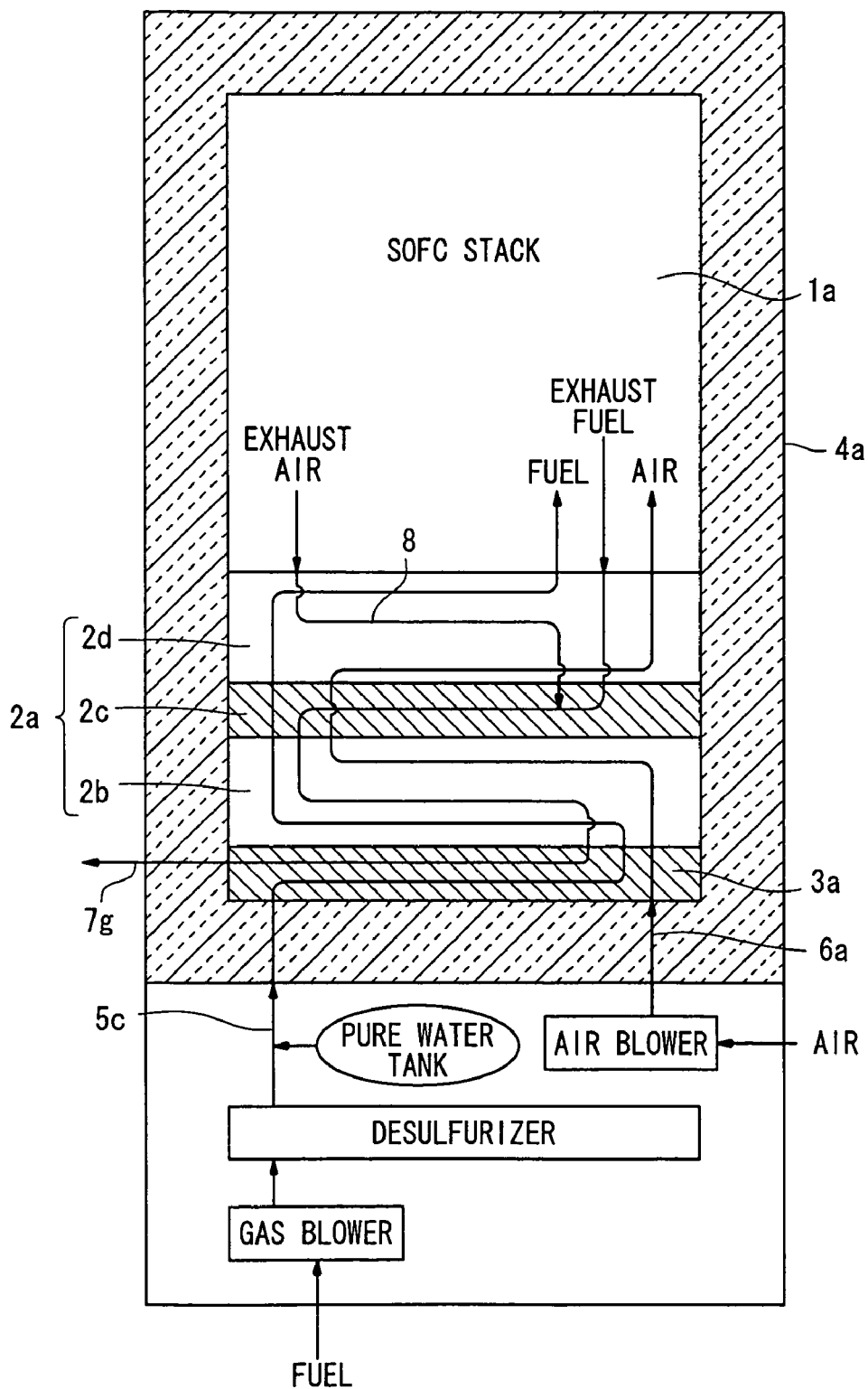
FIG. 19 is a view schematically showing a solid oxide fuel cell system according to a conventional technique 2.

FIG. 17 is a partial cross sectional view showing a fuel cell system 140 according to the fourth embodiment of the present invention.

In the fuel cell system 140, a partition wall 142 is provided at the end plate 70a. The partition wall 142 is coaxial with the protrusion 76, and covers the hole 80. The partition wall 142 has a ring shape, and an end of the partition wall 142 contacts the reformer 16 for separating the channel 108 from the hole 80.

In the reformer 16, a curved pipe member 144 is provided. An end of the pipe member 144 extends outwardly from the partition wall 142, and is connected to the channel 108 of the heat exchanger 14. The other end of the pipe member 144 is positioned inside the partition wall 142, and is opened to the hole 80.

In the fourth embodiment, the air supplied from the air supply pipe 104 to the channel 108 of the heat exchanger 14 is heated by the heat exchange with the exhaust gas flowing through the channel 110 of the heat exchanger 14. The hot air flows into one end of the pipe member 144 provided at the chamber 98.

The pipe member 144 is provided inside the reformer 16. The hot air flows through the pipe member 144 for heating the reformer 16 from the inside. After the air heats the reformer 16, the air flows out of the other end of the pipe member 144, and is supplied into the fuel cell stack 12 through the hole 80.

In the fourth embodiment, after the air is heated by the heat exchange with the exhaust gas discharged from the fuel cell stack 12, the hot air flows inside the reformer 16 through the pipe member 144. Thus, the same advantages as in the cases of the first to third embodiments can be obtained. For example, the reformer 16 is heated suitably, and the exhaust heat is utilized effectively.

In the fourth embodiment, in the same manner as in the case of the third embodiment, a second channel member (not shown) for supplying the exhaust gas after the heat exchange to the area around the reformer 16 may be provided for heating the reformer 16 from both sides, i.e., from the outside and the inside of the reformer 16.

The invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell system comprising:
   a fuel cell stack formed by stacking a plurality of fuel cells in a stacking direction, said fuel cells each including an electrolyte electrode assembly and separators sandwiching said electrolyte electrode assembly, said electrolyte electrode assembly including an anode, a cathode, and an electrolyte interposed between said anode and said cathode;
   a heat exchanger for heating an oxygen-containing gas to be supplied to said fuel cell stack;
   a reformer for reforming a fuel to produce a fuel gas; and
   a casing containing said fuel cell stack, said heat exchanger, and said reformer,
   wherein a fluid unit including at least said heat exchanger and said reformer is provided on one side of said fuel cell stack in said casing,
   heat exchange between an exhaust gas discharged from said fuel cell stack and the oxygen-containing gas is performed at said heat exchanger, and after the heat exchange, the oxygen-containing gas is supplied to said fuel cell stack, and said reformer is heated by the exhaust gas discharged from said heat exchanger.

2. A fuel cell system according to claim 1, wherein said fluid unit is provided symmetrically with respect to the central axis of said fuel cell stack.

3. A fuel cell system according to claim 1, wherein in said fluid unit, said reformer is provided inside said heat exchanger.

4. A fuel cell system according to claim 1, wherein after the heat exchange, the oxygen-containing gas heats said reformer before it is supplied to said fuel cell stack.

5. A fuel cell system according to claim 4, wherein said heat exchanger and said reformer are provided adjacent to said fuel cell stack.

6. A fuel cell system according to claim 4, further comprising an oxygen-containing gas channel member forming a channel for allowing the oxygen-containing gas discharged from said heat exchanger after heat exchange to flow around said reformer.

7. A fuel cell system according to claim 4, further comprising a pipe member for allowing the oxygen-containing gas discharged from said heat exchanger after heat exchange to flow into said reformer.

8. A fuel cell system according to claim 4, further comprising an exhaust gas channel member forming a channel for allowing the exhaust gas discharged from said heat exchanger after heat exchange to flow around said reformer.

9. A fuel cell system according to claim 4, wherein said fuel cell stack comprises a fuel gas supply unit extending in the stacking direction for supplying the fuel gas to said anode, and an oxygen-containing gas supply unit extending in the stacking direction for supplying the oxygen-containing gas to said cathode; and said fuel gas supply unit is provided inside said oxygen-containing gas supply unit.

10. A fuel cell system according to claim 1, wherein a load applying mechanism is provided on the other side of said fuel cell stack for applying a tightening load to said fuel cells in the stacking direction.

11. A fuel cell system according to claim 10, wherein said load applying mechanism is provided symmetrically with respect to the central axis of said fuel cell stack.

12. A fuel cell system according to claim 1, wherein the reformer defines part of an exhaust gas discharge channel extending from a discharge opening of said heat exchanger to the exhaust gas pipe.

* * * * *